UNITED STATES PATENT OFFICE.

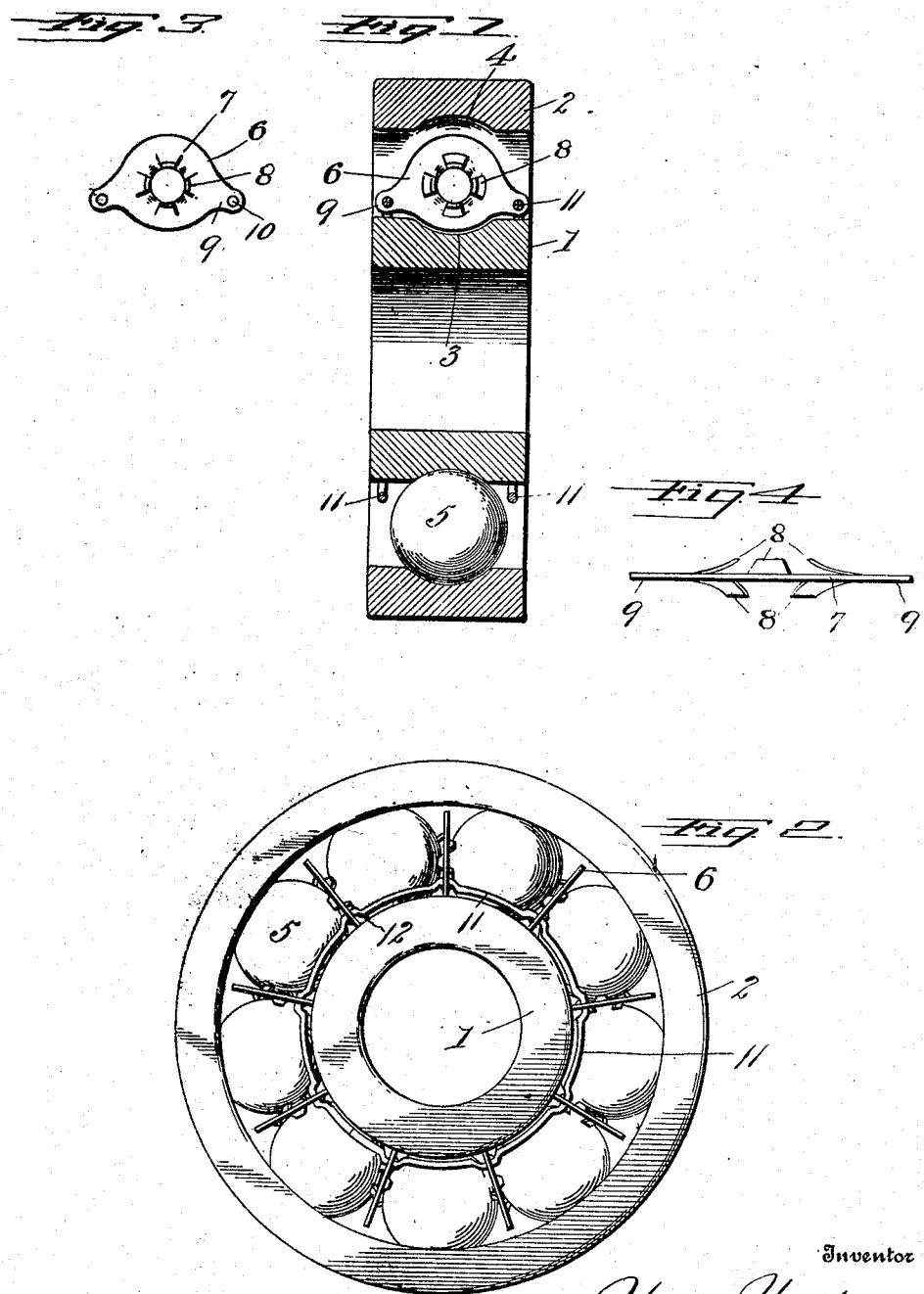

HENRY HESS, OF PHILADELPHIA, PENNSYLVANIA.

BALL-BEARING.

No. 930,599.  Specification of Letters Patent.  Patented Aug. 10, 1909.

Application filed February 21, 1906. Serial No. 302,252.

*To all whom it may concern:*

Be it known that I, HENRY HESS, a citizen of the United States, and a resident of Philadelphia, in the county of Philadelphia and State of Pennsylvania, have invented a new and useful Ball-Bearing, of which the following is a specification.

My invention relates to ball-bearings, and especially to an improved separator for balls, and to the combination of such separator with bearings of different types.

A principal characteristic of my improved separator is that it may be made to occupy very little longitudinal space in the bearing if desired. This enables bearings to be filled with a larger number of balls than is possible with the usual style of separators, securing an increased carrying capacity in bearings of given dimensions, and other desirable results, while retaining the advantages of the spaced or "silent" type of ball bearing.

My invention is explained hereafter more in detail in connection with the accompanying drawing, which illustrates exemplifying structures embodying my invention, and in which:

Figure 1 is a longitudinal section of a bearing of any suitable form, with my separators in place; Fig. 2, an end view of the same; Fig. 3, a side view of a single separator; and Fig. 4, a top view of the separator of Fig. 3.

Figs. 1 and 2 show a bearing composed of an inner ring 1 and an outer ring 2, provided respectively with races 3 and 4, in which are carried a suitable number of balls 5. Between each two adjacent balls is inserted a separator 6, formed conveniently from a blank of relatively-thin, flat spring metal. On each side of each separator is provided an elastic or flexible ball-engaging device, conveniently formed, as best shown in Figs. 3 and 4, by removing a circular disk of metal from the center of the blank, and cutting radiating slits 7 at suitable intervals. The spines 8 thus formed are bent alternately toward opposite sides of the blank, so that their ends form a series of circularly-disposed fingers adapted to engage a segment of a ball. The separators so formed may be placed between the balls of any of a large variety of ball bearings, and I do not limit myself to their use in any specific bearing. The spines 8 being of thin, flexible metal, permit a certain desirable amount of relative movement of the balls in the direction of their rotation around the shaft. Each separator is retained in position independently of the others by engagement of the spines 8 with the adjacent balls, but may be, if desired, easily sprung out. In many cases it is desirable to connect the separators in a bearing, so as to prevent accidental displacement, limit their movement, etc. For this purpose I may provide ears 9 on each separator, each having a perforation 10. A wire or other retainer 11 is passed through the perforations of the separators, one on each side of the bearing, and the ears are preferably so proportioned that the retaining wires 11 lie near or within the limits of the bearing rings, as shown in Fig. 1. Preferably a bend or kink 12 is formed in the wire 11 where it passes through each ear, serving to limit motion of the separators in relation to each other and to the retainer to a desired extent. It is desirable, however, to shape the kinks 12 as shown, so that a slight amount of movement of the separators is permitted.

It will be observed that by reason of the method of construction employed, the longitudinal space occupied by the separators, while they embody all other advantages hereinabove set forth, is very small, being considerably less than a ball diameter.

I contemplate any changes in the construction shown and described which may be made within the spirit of my invention, and do not limit myself to points of detail.

What I claim is:

1. In a ball bearing, a separator formed from a sheet spring metal blank, having an approximately central portion of the metal removed, and slits cut radially therefrom, the spines so made being bent alternately in opposite directions, forming on each side of the blank a series of elastic fingers adapted to engage a segment of a ball and to retain the separator in position, to prevent contact of two adjacent balls, and to permit desirable relative movement of said balls.

2. As a new article of manufacture, a separator for ball-bearings comprising a body of sheet metal provided on each side with a plurality of elastic fingers adapted to yieldingly engage the segment of a ball.

3. In a ball bearing, a plurality of separators, each having a body of sheet metal, a plurality of fingers on each side of the body, adapted to engage a segment of a ball, and a perforated ear at each side, one of said separators being placed between each two adjacent balls, and a retainer on each side of the bearing, passing through the perforations in the ears on the corresponding side and so formed as to allow each separator a limited amount of motion.

4. In a ball bearing, a plurality of separators, each having a body of elastic sheet metal, a plurality of elastic fingers on each side of the body, adapted to engage a segment of a ball, and a perforated ear at each side, one of said separators being placed between each two adjacent balls, and a retainer on each side of the bearing, passing through the perforations in the ears on the corresponding side and so formed as to allow each separator a limited amount of motion.

5. As a new article of manufacture, a separator for ball-bearings consisting of a body having on each of two opposite sides a plurality of yielding fingers adapted to engage a ball surface.

6. In a ball bearing, two bearing rings provided with races, balls in the races and separators interposed between adjacent balls each comprising flexible fingers adapted to separate said balls.

In testimony whereof I have affixed my signature in the presence of two witnesses.

HENRY HESS.

Witnesses:
   THEO. H. McCALLA,
   C. F. McCALLA.